(12) United States Patent
Altman et al.

(10) Patent No.: US 7,971,033 B2
(45) Date of Patent: Jun. 28, 2011

(54) LIMITING ENTRIES IN LOAD ISSUED PREMATURE PART OF LOAD REORDER QUEUE SEARCHED TO DETECT INVALID RETRIEVED VALUES TO BETWEEN STORE SAFE AND SNOOP SAFE POINTERS FOR THE CONGRUENCE CLASS

(75) Inventors: Erik R. Altman, Danbury, CT (US); Vijayalakshmi Srinivasan, New York, NY (US)

(73) Assignee: International Business Machines, Armonk, NY (US)

( * ) Notice: Subject to any disclaimer, the term of this patent is extended or adjusted under 35 U.S.C. 154(b) by 262 days.

(21) Appl. No.: 12/172,521

(22) Filed: Jul. 14, 2008

(65) Prior Publication Data

US 2008/0276077 A1  Nov. 6, 2008

Related U.S. Application Data

(62) Division of application No. 11/427,928, filed on Jun. 30, 2006, now Pat. No. 7,401,209.

(51) Int. Cl.
*G06F 9/312* (2006.01)

(52) U.S. Cl. ........ 712/216; 711/140; 711/146; 712/225; 712/E9.048; 712/E9.049

(58) Field of Classification Search .................. None
See application file for complete search history.

(56) References Cited

U.S. PATENT DOCUMENTS

| | | | |
|---|---|---|---|
| 5,737,636 A | 4/1998 | Caffo et al. | |
| 5,745,729 A | 4/1998 | Greenley et al. | |
| 5,751,983 A * | 5/1998 | Abramson et al. | ............ 712/216 |
| 6,266,768 B1 | 7/2001 | Frederick, Jr. et al. | |
| 7,302,527 B2 | 11/2007 | Barrick et al. | |

* cited by examiner

*Primary Examiner* — Kenneth S Kim
(74) *Attorney, Agent, or Firm* — Cantor Colburn LLP; Louis J. Percello

(57) ABSTRACT

A method for reducing the number of load instructions in the load reorder queue (LRQ) that are searched when a load instruction is executed by a processor, including dispatching the load instructions; inserting the load instructions in the LRQ in program order; clearing a load received data field; executing the load instructions; checking load reorder queue (LRQ) entries; re-executing the load instruction of the matching LRQ entry; continuing execution; getting the load data; setting the load received data field; comparing a load sequence number (LSQN) of each load instruction to a snoop_safe register contents; ANDing all the load received data bits if the LSQN is greater in magnitude to the snoop_safe; setting the snoop_safe register to the LSQN of the load instruction; searching the LRQ entry; and setting a load_peril_snoop register to the LRQ index value where the first load instruction younger to the snoop_safe was found.

1 Claim, 4 Drawing Sheets

LIMITING ENTRIES IN LOAD ISSUED PREMATURE PART OF LOAD REORDER QUEUE SEARCHED TO DETECT INVALID RETRIEVED VALUES TO BETWEEN STORE SAFE AND SNOOP SAFE POINTERS FOR THE CONGRUENCE CLASS

CROSS REFERENCE TO RELATED APPLICATIONS

This application is a divisional of U.S. patent application Ser. No. 11/427,928 filed Jun. 30, 2006, the contents of which are incorporated by reference herein in their entirety.

STATEMENT REGARDING FEDERALLY SPONSORED RESEARCH

This invention was made with Government support under Contract No. NBCH3039004 awarded by the Defense Advanced Research Projects Agency (DARPA). The Government has certain rights in this invention.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of Invention

This invention relates in general to computers, and more particularly, to reducing the number of in-flight load instructions searched by loads, stores, or snoops executed by a processor.

2. Description of Background

In out-of-order processors, instructions may execute in an order other than what the program specified. For an instruction to execute on an out-of-order processor, only three conditions need normally be satisfied:

(1) the inputs to the instruction are available;
(2) a function unit is available on which to execute the instruction;
(3) there is a place to put the result.

For most instructions, these requirements are relatively straight-forward. However, for load instructions, accurately determining condition (1) is difficult. Load instructions have two inputs: (a) registers, which specify the address from which data is to be loaded, and (b) the memory location(s) from which the load data will come. Determining the availability of register values in case (a) is relatively straight-forward. However, determining the availability of memory locations in case (b) is not. The problem with memory locations is that there may be stores earlier in program order than a particular load, and some of these stores may not have executed, when the remaining parts of the three conditions above are satisfied, for example, (1) when all of the register inputs for the load instruction are ready, (2) there is a function unit available on which the load can be executed, and (3) there is a place (a register) in which to put the loaded value. Since earlier stores have not yet executed, it may be that the data location to which these stores write, are some of the same data locations from which the load reads. In general, without executing the store instructions, it is not possible to determine if the address, for example, data locations, to which a store writes overlap the address from which a load reads.

As a result, most modern out-of-order processors execute load instructions when (1) all of the input register values are available, (2) there is a function unit available on which to execute the load, and (3) there is a register where the loaded value may be placed. Since dependences on previous store instructions are ignored, a load instruction may sometimes execute prematurely, and have to be squashed and re-executed so as to obtain the correct value produced by a prior store instruction.

To detect when a load instruction has executed prematurely, modern processors typically have a load reorder queue (LRQ), which keeps a list of all in-flight loads. In-flight loads have been fetched and decoded by the processor, but have not fully completed their execution, or are waiting on older instructions in the program to finish their execution. Completed means that the loads have finished executing, and thus each of these instructions can be represented to the programmer or anyone else viewing execution of the program as having completed their execution.

The LRQ is normally sorted by the order of loads in the program. Each entry in the LRQ has, among other information, the address(es) from which the load received data.

Each time a store executes, it checks the LRQ to determine if any loads which are after the store in program order, nonetheless executed before the store, and if so, whether any of those loads read data from a location to which the store writes. If so, the store signals the appropriate parts of the processor that the load has received a bad value and must re-execute.

There may be many loads in-flight at any one time: modern processors allow 16, 32, 64 or more loads to be simultaneously in-flight. Thus, a store instruction must check 16, 32, 64 or more entries in the LRQ to see if those loads executed prematurely.

Since new store instructions may occur each cycle in a modern processor, these checks for premature load execution must take at most one cycle, for example, all 16, 32, 64 or more entries in the LRQ must be able to be checked every cycle. Such a fully associative comparison is known to be expensive (a) in terms of the area required to perform the comparison, (b) in terms of the amount of energy required to perform the comparison, and (c) in terms of the time required to perform the comparison, for example, a cycle may have to take longer than it otherwise would so as to allow time for the comparison to complete. All three of these factors (a), (b), and (c) are significant concerns in the design of modern processors.

Related problems arise when a processor is one of a plurality of processors in a multiprocessor (MP) system. Different MP systems have different rules for the ordering of load and store instructions executed on different processors. At a minimum, most MP systems require a condition known as sequential load consistency, which means that if processor X stores to a particular location A, then all loads from location A on processor Y must be consistent. In other words, if an older load in program order on processor Y sees the updated value at location A, then any younger load in program order on processor Y must also see that updated value.

If all of the loads on processor Y were executed in order, such sequential load consistency would happen naturally. However, on an out-of-order processor, the younger load in program order may execute earlier than the older load in program order. If processor X updates the location from which these two loads read, the sequential load consistency will be violated.

To avoid problems with sequential load consistency, each time a processor writes to a particular location, it conceptually informs every other processor that it has done so. In practice, most processor systems have mechanisms that avoid the need to inform every processor of every individual store performed by other processors. These mechanisms are beyond the scope of the proposed invention and apply equally well to the proposed invention as to the standard solution described herein.

However, even with these mechanisms there is some subset of stores about which other processors must be informed. When a processor Y receives notice (a snoop) that another processor X has written to a location, processor Y must ensure that all of the loads currently in-flight receive sequentially load consistent values. The check to ensure these conditions is similar to the check previously described for store instructions; each entry in LRQ is checked to see if it matches the snoop address stored to by the other processor X.

All entries in the LRQ that match the snoop address have a snooped bit set to indicate that they match the snoop. All load instructions check this snooped bit when they execute. More precisely, when a load instruction (L) executes, it checks all entries in the LRQ to see if there are any load instructions (M) which satisfy all of the following conditions:

(4) load M is younger in program order than the current load L;

(5) load M is from the same address as the current load L;

(6) load M has already executed;

(7) load M has the snooped bit set.

Any load in the LRQ meeting all of these conditions must re-execute so as to maintain sequential load consistency, for example, to ensure that the younger load Y does not receive an older value than the older load L.

Just as it is problematic for area, power and cycle time that store instructions must check the large number of entries in the LRQ, it is problematic that snoops must also check this large number of entries in the LRQ.

Thus, there is a need for a method to reduce the number of LRQ entries that are checked each cycle and still maintain fast and correct execution. Furthermore, there is a need for a method to reduce the number of LRQ entries that are checked at each snoop and still maintain fast and correct execution. Such a solution will contribute to improved performance in an out-of-order processor.

SUMMARY OF THE INVENTION

The shortcomings of the prior art are overcome and additional advantages are provided through the provision of a method for reducing the number of load instructions in a load reorder queue (LRQ) that are searched when a load instruction is executed by a processor, the method comprising: dispatching the load instructions to an issue queue (IQ) in program order; inserting the load instruction in the LRQ in program order; clearing the load received data field in the LRQ for the dispatched load instruction; executing the load instructions by removing the load instructions from the IQ; checking all the LRQ entries located between a load_peril_snoop register and a lrq_tail register with a snooped bit set and with a matching data address as that of the currently executing load instruction; re-executing the load instruction of the matching LRQ entry; continuing execution of the currently executing load instruction; getting the load data from the memory and sending the data to the load instruction's destination register; setting the load received data field in the LRQ entry for the load instruction whose data has been sent to the load instruction's destination register; comparing the load sequence number (LSQN) of the currently executing load instruction to a snoop_safe register contents; ANDing all the load received data bits in the LRQ located between a lrq_head register and the load instruction if the LSQN is greater in magnitude than the snoop_safe register; setting the snoop_safe register to the LSQN of the load instruction if the result of ANDing is equivalent to 1; searching the LRQ entry starting at the load_peril_snoop index to the first load instruction younger than the snoop_safe is located; and setting the load_peril_snoop register to the LRQ index value where the first load instruction younger than the snoop_safe was found.

The shortcomings of the prior art are overcome and additional advantages are provided through the provision of a method for reducing the number of entries searched in a load reorder queue (LRQ) when a store instruction is executed by a processor, the method comprising: dispatching the store instructions to an issue queue (IQ) in program order; inserting the store instructions in a store queue (SQ) in program order; clearing an address valid bit for each store instruction located in the SQ for the dispatched store instruction; removing the store instruction from the IQ when it is ready to execute; ANDing all address valid bits in the SQ located between a store queue head register and the location of the removed store instruction from the IQ; setting a store_safe register to a value of a store sequence number (SSQN) of the removed store instruction from the IQ if the result of the ANDing is equivalent to 1; searching a load reorder queue (LRQ) starting at a load_peril_store index location to the first load instruction younger than the store_safe register is located; setting the load_peril_store register to the index where the first load instruction younger than the store_safe register was located; checking entries between a lrq_tail register and the load_peril_store register for addresses matching the address of the store instruction; and re-executing the load instruction of the LRQ entry.

The shortcomings of the prior art are overcome and additional advantages are provided through the provision of a method for reducing entries searched in a load reorder queue (LRQ) when snoop instructions are executed by a processor, comprising: checking load reorder queue (LRQ) entries located between a load_peril_snoop register and a lrq_tail register for addresses matching the address of the snoop; and setting a snooped bit in the LRQ entry for any match found.

The shortcomings of the prior art are overcome and additional advantages are provided through the provision of a method for reducing the number of entries searched in a load reorder queue (LRQ) when load instructions are executed by a processor involving a load issued prematurely (LIP) register, comprising: retrieving load instructions from an issue queue (IQ) to begin execution; determining the LIP congruence class based on the effective address of the load instruction; checking for both a store sequence number (SSQN) older than a store_safe register and a load sequence number (LSQN) older than a snoop_safe register in the congruence class indicated by the address from which the load instruction is reading data; replacing one of the older entries if the SSQN is older than the store_safe register and the LSQN is older than the snoop_safe register; and clearing a LIP PTR valid bit in a load reorder queue (LRQ) for the entry that is replaced.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution for a method for reducing the number of LRQ entries searched when load instructions are executed by a processor. A method for reducing the number of LRQ entries searched when store instructions, are executed by a processor is included. A method for reducing the number of LRQ entries searched when snoop instructions are executed by a processor is included. A method for reducing the number of LRQ entries searched when load instructions are executed by a processor involving a load issued prematurely (LIP) register is also included.

BRIEF DESCRIPTION OF THE DRAWINGS

The subject matter, which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In order to execute the following methods four new micro-architectural registers have been introduced. The first two registers are used to identify a set of load instructions that may execute incorrectly with respect to snoops arriving from other processors (threads of execution). The second two registers are used to identify the set of load instructions that may execute incorrectly with respect to store instructions in the same program (thread of execution). More specifically, these registers include a snoop_safe register that contains the load sequence number (LSQN) of the youngest load, L, for which L and all loads older than L have received their data. The snoop_safe register requires an additional bit be included in each load reorder queue entry. A load_peril_snoop register contains an index in the LRQ of the oldest load that is younger than the load indicated by the snoop_safe. A store_safe register contains a store sequence number (SSQN) of the youngest store, S, for which S and all stores older than S have had their address resolved. A load_peril_store register contains the index in the LRQ of the oldest load that is younger than the store indicated by the store_safe register.

The actions performed in the preferred embodiment of the processor that differ from the prior art shall be described in the following paragraphs. This description also includes the existence of two commonly utilized micro-architectural registers, one being a lrq_tail register which contains the location in the LRQ where load instructions are placed in program order after being fetched and decoded. The other register is a lrq_head register that contains the location in the LRQ where load instructions are removed when the load instruction and all instructions before the load in program order have successfully completed their execution.

Figure 5:
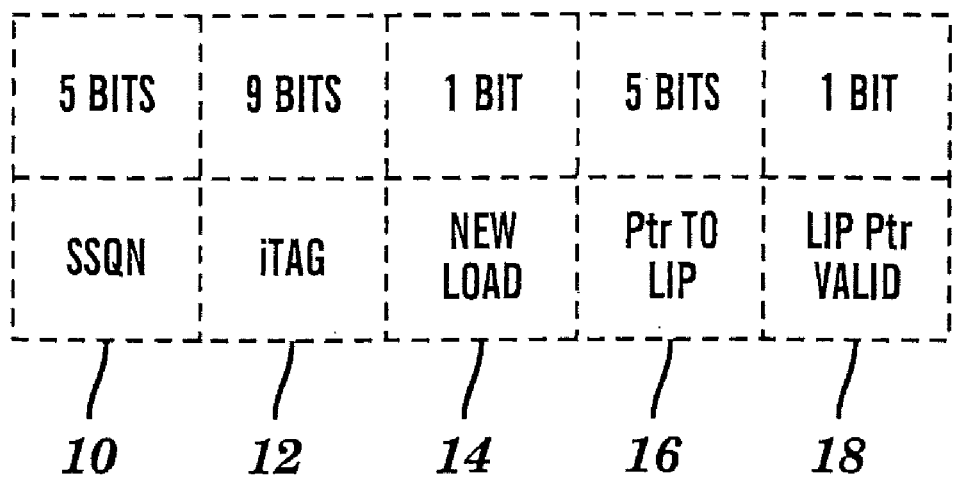
FIG. 5 illustrates one example of a Load Reorder Queue (LRQ).

The LRQ structure of the exemplary embodiments of the present application is as follows. The LRQ, which is a FIFO structure, i.e., loads enter at dispatch time and leave at completion/retire time. Load Issued Prematurely, which is a cache-like structure, is indexed by address. Loads enter at issue time, or when the real address of the load is known. Loads exit at completion/retire time in program order. The two main registers are: LRQ_HEAD=Index into LRQ of oldest load in flight and LRQ_TAIL=Index into LRQ of youngest load in flight. FIG. 5 illustrates an LRQ entry. The LRQ entry contains an SSQN entry 10, a iTag entry 12, a New Load entry 14, a Ptr to LIP entry 16, and a LIP Ptr Valid entry 18. The SSQN entry 10 is a Store Sequence Number, which informs load L what stores are older than L and what stores are younger than L. The iTag entry 12 is a Global Instruction Tag, i.e., a unique identifier for this instruction distinguishing it from all other instructions in flight. The New Load entry 14 is load instructions that may be divided or "cracked" into multiple simpler microinstructions or "IOPS." The "New Load" flag indicates if this load is first IOP of a load instruction. The Ptr to LIP entry 16 is an index into LIP structure for this load. In the exemplary embodiment, this index directly indicates the position of the load in the LIP, not the position in the congruence class of the LIP. The LIP Ptr Valid entry 18 indicates if there is a corresponding LIP entry for this load, and hence whether the "Ptr to LIP" field should be ignored.

Figure 1:
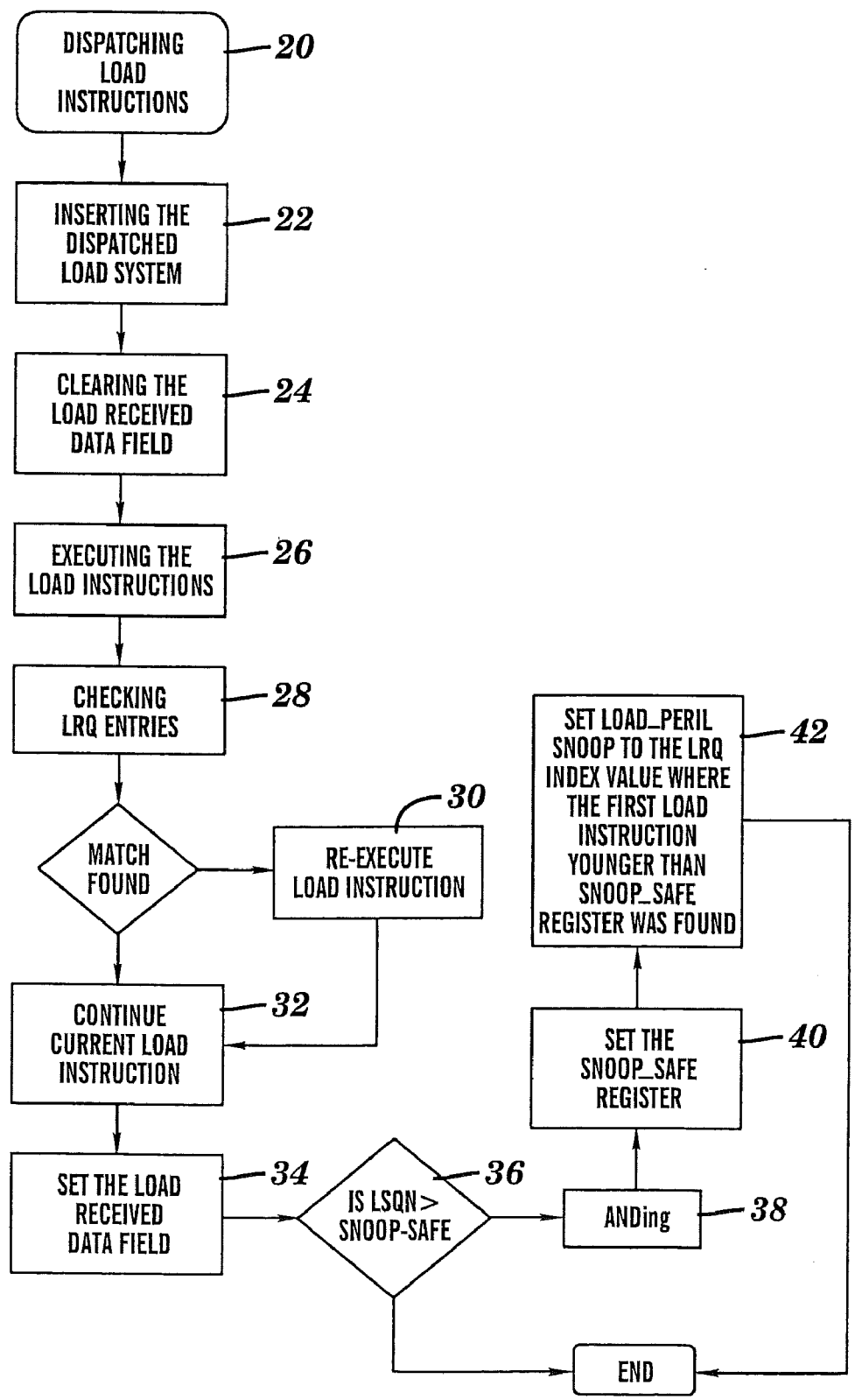
FIG. 1 illustrates one example of a flowchart of a method for reducing the number of load instructions in a load reorder queue (LRQ) that are searched when a load instruction is executed by a processor.

Referring to FIG. 1, a method for reducing the number of load instructions in a load reorder queue (LRQ) that are searched when a load instruction is executed by a processor will now be explained. The method begins at step 20 with dispatching of the load instruction to an issue queue (IQ) in program order. The IQ contains the sequencing of instructions that are awaiting processing.

At step 22, the dispatched load instruction is inserted in the load reorder queue (LRQ) in program order.

At step 24, the load received data field in the LRQ for the dispatched load instruction is cleared. As the name load received data suggests, a bit is set once the data for the load has been delivered to its destination.

At step 26, the load instruction leaves the IQ to begin execution.

At step 28, all the LRQ entries located between a load_peril_snoop register and a lrq_tail register for addresses matching the address of the load instruction and whose snooped bit is set, are checked. In prior art, all LRQ entries must be checked against each snoop. The proposed invention avoids the necessity of checking LRQ entries between the load_peril_snoop and lrq_head registers.

At step 30, the matching load instruction in the LRQ is re-executed.

At step 32, the execution of the current load is continued.

At step 34, the load received data field is set in the LRQ entry for each load instruction when the load data arrives at the load instruction's destination register. As already discussed, the LRQ typically has a lrq_tail register where new entries are added at dispatch time and, a lrq_head register where entries are removed at completion or retire time. The load sequence number (LSQN) is typically just the relative position of the load between these lrq_head and lrq_tail locations.

At step 36, the load sequence number (LSQN) of the currently executing load instruction is compared to a snoop_safe register contents. If the LSQN is greater in magnitude than the snoop_safe register contents, at step 38, all the load received data bits in the LRQ located between the lrq_head register and the load instruction go through a logical AND operation.

At step 40, the snoop_safe register is set to the LSQN of the load instruction if the result of ANDing is equivalent to 1.

At step 42, the load_peril_snoop register is set to the LRQ index value where the first load instruction younger than the snoop_safe register was found.

Figure 2:
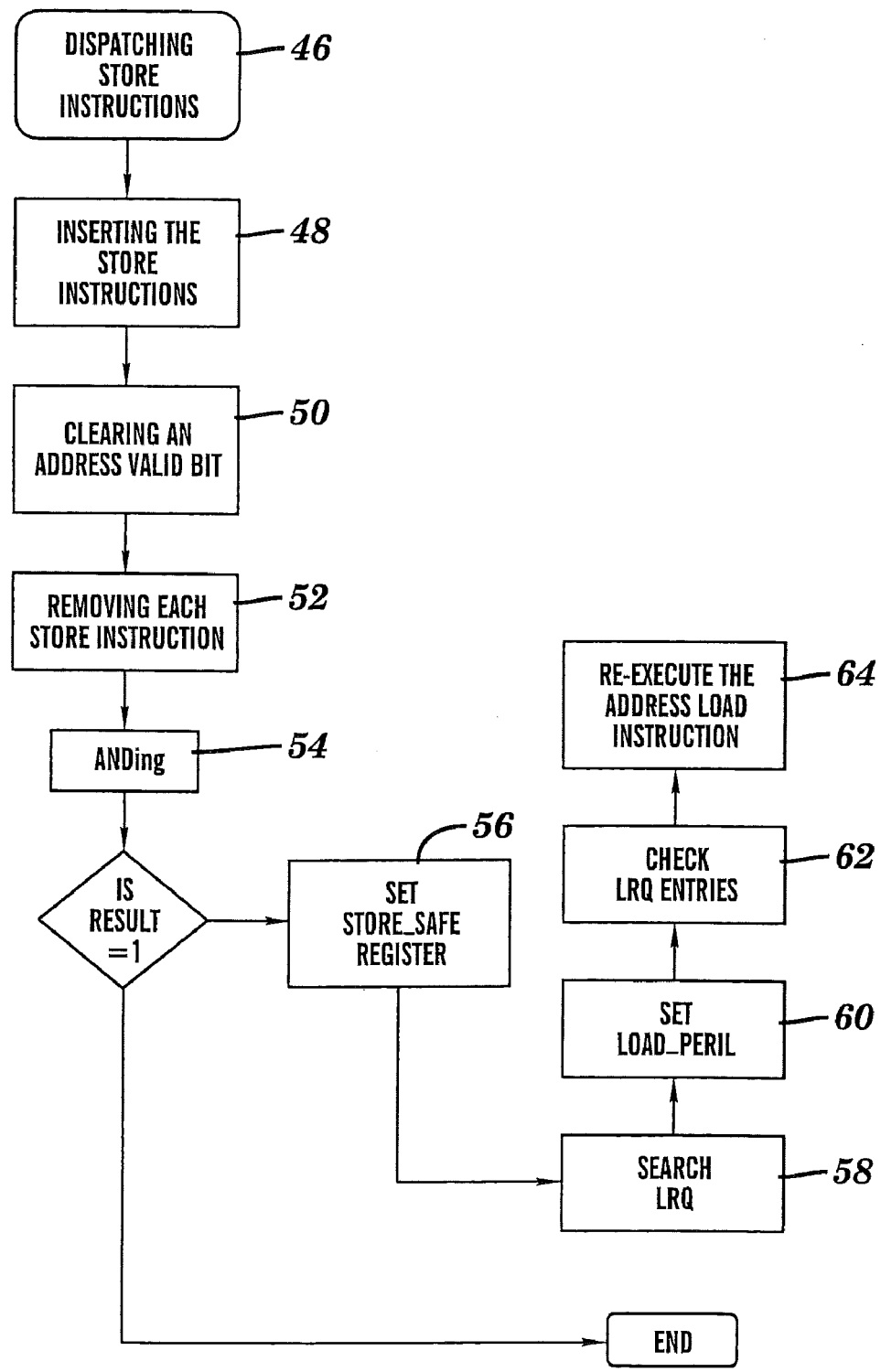
FIG. 2 illustrates one example of a flowchart of a method for reducing the number of entries searched in a load reorder queue (LRQ) when a store instruction is executed by a processor.

Referring to FIG. 2, a method for reducing the number of entries searched in a load reorder queue (LRQ) when a store instruction is executed by a processor shall be explained. At step 46, the store instruction is dispatched to an issue queue (IQ) in program order and at step 48 the store instructions is inserted into a store queue (SQ) in program order.

At step 50, an address valid bit for that store instruction located in the SQ is cleared.

At step 52, the store instruction leaves the IQ to begin execution.

At step 54, all address valid bits in the SQ located between a store queue head location and the location of the store instruction that just left the IQ go through a logical AND operation. Note, the store queue head location is where store instructions complete/retire.

At step 56, a store_safe register to the value of a store sequence number (SSQN) of this store is set if the result of the ANDing is equivalent to 1.

At step 58, a load reorder queue (LRQ) starting at a load_peril_store index location to the first load instruction younger than the store_safe register is located is searched if the result of the ANDing is equivalent to 1.

At step 60, the load_peril_store register to the index where the first load instruction younger than the store_safe register was located is set if the result of the ANDing of step 52 is equivalent to 1.

At step 62, all LRQ entries between a lrq_tail register and the load_peril_store register for addresses matching the address of the store instruction, are checked. In prior art, LRQ entries must be checked against each store. The proposed invention avoids the necessity of checking LRQ entries between the load_peril_store and lrq_head registers.

At step 64, the load instruction corresponding to the matching LRQ entry is re-executed.

Figure 3:
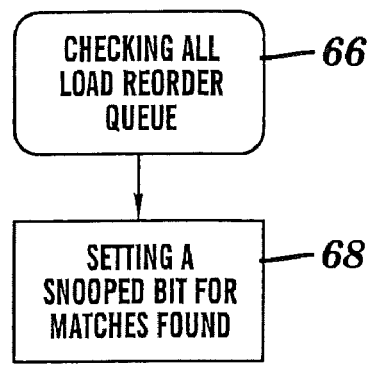
FIG. 3 illustrates one example of a flowchart of a method for reducing the number of entries searched in the a load reorder queue (LRQ) when snoop instructions are executed by a processor.

Referring to FIG. 3, a method of reducing entries searched in a load reorder queue (LRQ) when snoop instructions are executed by a processor shall be explained. At step 66, all load reorder queue (LRQ) entries located between a load_peril_snoop register and a lrq_tail register for addresses matching the address of the snoop are checked. Then at step 68, a snooped bit in the corresponding LRQ entry for any matches found is set. In prior art, all LRQ entries must be checked against each snoop. The proposed invention avoids the necessity of checking LRQ entries between the load_peril_snoop and lrq_head registers.

As previously discussed, not all LRQ entries are checked when a snoop arrives. However, it is guaranteed that all LRQ entries are checked for which: (a) there are older stores whose addresses are not yet resolved; or (b) there are older loads whose data has not yet arrived.

If all previous loads have had their data arrive for a younger load, then data for all previous loads must also have arrived for any older load. Thus, with respect to the snoop, all loads older than the youngest load, Y, for which all previous loads have had their data arrive have finished execution but not necessarily completed/retired. Thus, these older loads all saw a consistent picture of memory prior to the snoop, and all loads after load Y will see a consistent picture of memory after the snoop.

Figure 4:
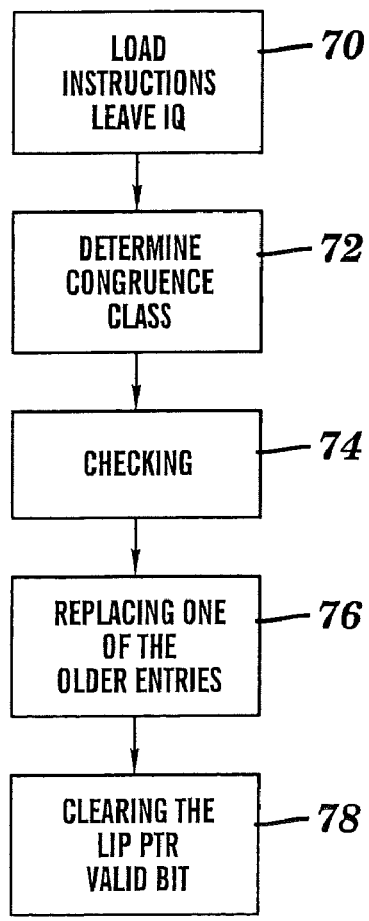
FIG. 4 illustrates one example of a flowchart of a method for reducing the number of entries searched in the LRQ when load instructions are executed by a processor involving a load issued prematurely register.

Referring to FIG. 4, an alternate embodiment results from applying the general approach described previously to a load issued prematurely concept wherein, a method for reducing a number of entries searched in the LRQ when load instructions are executed by a processor involving a load issued prematurely (LIP) register shall be explained. In the LIP concept, a load reorder queue (LRQ) is divided into two parts. The first part is the LRQ, which is a first in first out (FIFO) structure where loads enter at dispatch time and leave at completion/retire time, loads both enter and leave in program order. The second part is the load issued prematurely, which is a cache-like structure indexed by address. Loads enter at issue time or precisely when the real address of the load is known. Loads exit at completion/retire time in program order.

In this alternate LIP concept, stores and snoops check the LIP, instead of the LRQ, to determine if any loads executed prematurely and incorrectly. More precisely, in the LIP concept, all stores from a thread check the LIP to determine if any loads from the same thread executed prematurely. Likewise, all snoops from other threads check the LIP.

The alternate embodiment uses the concepts previously described in this application. However, instead of limiting which entries in the LRQ are examined by a store or snoop, the alternate embodiment removes load instruction entries from the LIP which are guaranteed to have executed correctly, no matter the snoops that subsequently arrive or the stores that subsequently execute.

This set of safe loads which can be removed from the LIP are specified by store_safe and snoop_safe, just as in the first embodiment discussed with FIG. 1. If a load instruction is (a) older than the store specified by the store_safe register and, (b) older than the load specified by the snoop_safe register then there is no longer any possibility of the load having executed incorrectly or inconsistently and its entry can be removed from the LIP. Indeed with the alternate embodiment, the load_peril_store and the load_peril_snoop registers are not necessary. Only one change to the basic LIP concept is necessary. The change occurs at the time when a load instruction leaves the IQ to actually execute in determining which entry in the LIP should be replaced in order to make room for the new entry.

At step 70, load instructions leave an issue queue (IQ) to begin execution.

At step 72, the congruence class of the LIP is determined based on the address from which the load instruction is reading data.

At step 74, for both a store sequence number (SSQN) older than a store_safe register and a load sequence number (LSQN) older than a snoop_safe register for the corresponding LIP congruence class is checked.

At step 76, one of the older entries is replaced if the SSQN is older than the store_safe register and the LSQN is older than the snoop_safe register.

At step 78, a LIP PTR valid bit in a load reorder queue for the entry that is replaced is cleared.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for reducing the number of entries searched in a load issued prematurely (LIP) part of a load reorder queue (LRQ) to detect bad values retrieved by pending load instructions when load instructions are executed by a processor, comprising:

retrieving load instructions from an issue queue (IQ) to begin execution;

determining the LIP congruence class based on the effective address of the load instruction;

checking an entry in the LIP part of the LRQ for both a store sequence number (SSQN) of the load instruction being older than a store_safe register and a load sequence number (LSQN) of the load instruction being older than a snoop_safe register in the congruence class indicated by the address from which the load instruction is reading data, the store_safe register containing a SSQN of the youngest store, S, for which S and all stores older than S have had their address resolved, the snoop_safe register containing a LSQN of the youngest load, L, for which L and all loads older than L have received their data;

replacing checked entry in the LIP part of the LRQ with a newer load instruction entry if the SSQN of the checked entry is older than the store_safe register and the LSQN of the checked entry is older than the snoop_safe register; and clearing a LIP PTR valid bit in a load reorder queue (LRQ) for the checked entry that is replaced.

* * * * *